United States Patent
Pons et al.

(10) Patent No.: US 10,012,086 B2
(45) Date of Patent: Jul. 3, 2018

(54) GAS TURBINE ENGINE AIRFOIL PROFILE

(71) Applicant: UNITED TECHNOLOGIES CORPORATION, Farmington, CT (US)

(72) Inventors: David M. Pons, Lajas, PR (US); Loubriel Ramirez, Utuado, PR (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 253 days.

(21) Appl. No.: 15/034,429

(22) PCT Filed: Nov. 4, 2014

(86) PCT No.: PCT/US2014/063865
§ 371 (c)(1),
(2) Date: May 4, 2016

(87) PCT Pub. No.: WO2015/112222
PCT Pub. Date: Jul. 30, 2015

(65) Prior Publication Data
US 2016/0281509 A1    Sep. 29, 2016

Related U.S. Application Data

(60) Provisional application No. 61/899,525, filed on Nov. 4, 2013.

(51) Int. Cl.
*F02C 3/04* (2006.01)
*F01D 5/14* (2006.01)
(Continued)

(52) U.S. Cl.
CPC ............... *F01D 5/141* (2013.01); *F01D 9/02* (2013.01); *F01D 9/041* (2013.01); *F02C 3/04* (2013.01);
(Continued)

(58) Field of Classification Search
CPC . F01D 5/141; F01D 9/02; F01D 9/041; F05D 2250/74; F05D 2220/32;
(Continued)

(56) References Cited

U.S. PATENT DOCUMENTS

| 6,887,041 B2 | 5/2005 | Coke et al. |
| 7,094,034 B2 | 8/2006 | Fukuda et al. |

(Continued)

FOREIGN PATENT DOCUMENTS

EP    1231358 A2    8/2002

*Primary Examiner* — Jesse Bogue
(74) *Attorney, Agent, or Firm* — Carlson, Gaskey & Olds, P.C.

(57) ABSTRACT

An example airfoil includes an airfoil body with a leading edge and a trailing edge joined by a pressure side and a suction side to provide an external airfoil surface extending in a radial direction from at least one platform. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to +0.050 inches (+1.27 mm).

15 Claims, 4 Drawing Sheets

(51) Int. Cl.
*F01D 9/04* (2006.01)
*F01D 9/02* (2006.01)

(52) U.S. Cl.
CPC ...... *F05D 2220/32* (2013.01); *F05D 2240/12* (2013.01); *F05D 2250/711* (2013.01); *F05D 2250/74* (2013.01); *F05D 2260/202* (2013.01); *Y02T 50/672* (2013.01); *Y02T 50/673* (2013.01)

(58) Field of Classification Search
CPC ........... F05D 2240/12; F05D 2250/711; F05D 2260/202; F02C 3/04; Y02T 50/672; Y02T 50/673
See application file for complete search history.

(56) References Cited

U.S. PATENT DOCUMENTS

| | | | |
|---|---|---|---|
| 7,306,436 B2 | 12/2007 | Girgis et al. | |
| 7,329,092 B2 | 2/2008 | Keener et al. | |
| 7,329,093 B2 | 2/2008 | Vandeputte et al. | |
| 7,351,038 B2 | 4/2008 | Girgis et al. | |
| 7,354,249 B2 | 4/2008 | Girgis et al. | |
| 7,367,779 B2 | 5/2008 | Girgis et al. | |
| 7,384,243 B2 | 6/2008 | Noshi | |
| 7,387,490 B2 * | 6/2008 | Noera | F01D 5/141 415/191 |
| 7,390,165 B2 * | 6/2008 | Francini | F01D 9/041 415/191 |
| 7,396,211 B2 | 7/2008 | Tomberg et al. | |
| 7,402,026 B2 | 7/2008 | Girgis et al. | |
| 7,581,930 B2 | 9/2009 | Aggarwala et al. | |
| 8,439,645 B2 | 5/2013 | Tsifourdaris | |
| 8,511,979 B2 | 8/2013 | Marini | |
| 9,115,588 B2 * | 8/2015 | Nash | F01D 5/141 |
| 9,133,713 B2 * | 9/2015 | Allen-Bradley | F01D 5/141 |
| 2007/0183898 A1 | 8/2007 | Hurst et al. | |
| 2008/0056896 A1 * | 3/2008 | Trindade | F01D 5/141 415/208.1 |
| 2008/0101925 A1 | 5/2008 | Humanchuk et al. | |
| 2008/0124219 A1 * | 5/2008 | Kidikian | F01D 5/141 416/223 A |
| 2008/0124223 A1 * | 5/2008 | Marini | F01D 5/141 416/241 R |
| 2010/0172752 A1 | 7/2010 | McGovern et al. | |
| 2012/0057982 A1 | 3/2012 | O'Hearn et al. | |
| 2013/0136589 A1 | 5/2013 | Gustafson et al. | |
| 2013/0136606 A1 | 5/2013 | Smith et al. | |
| 2013/0136609 A1 | 5/2013 | Stein et al. | |
| 2014/0311149 A1 * | 10/2014 | Chuang | F04D 29/384 60/726 |
| 2016/0115795 A1 * | 4/2016 | Munoz | F01D 5/141 416/223 A |

* cited by examiner

GAS TURBINE ENGINE AIRFOIL PROFILE

BACKGROUND

This disclosure relates to a gas turbine engine, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

SUMMARY

An airfoil for a gas turbine engine according to an exemplary aspect of the present disclosure includes, among other things, an airfoil body including a leading edge and a trailing edge joined by a pressure side and a suction side spaced apart from the pressure side to provide an external airfoil surface extending in a radial direction from at least one platform. The external airfoil surface is formed in substantial conformance with multiple cross-sectional profiles of the airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to ±0.050 inches (±1.27 mm).

In a further non-limiting embodiment of the foregoing airfoil, the airfoil is a stator vane in a high pressure section of said turbine section.

In a further non-limiting embodiment of either of the foregoing airfoils, the span location corresponds to a distance from an engine central longitudinal axis.

In a further non-limiting embodiment of any of the foregoing airfoils, the distance is measured with respect to a reference radius.

In a further non-limiting embodiment of any of the foregoing airfoils, the airfoil body extends in the radial direction between an inner platform and an outer platform.

In a further non-limiting embodiment of any of the foregoing airfoils, the tolerance is a manufacturing tolerance of ±0.050 inches (±1.27 mm).

In a further non-limiting embodiment of any of the foregoing airfoils, the tolerance is a measurement tolerance of ±0.025 inches (±0.635 mm).

A gas turbine engine according to an exemplary aspect of the present disclosure includes, among other things, a compressor section, a combustor section fluidly connected to the compressor section and a turbine section fluidly connected to the combustor section. The turbine section includes at least one airfoil. The at least one airfoil includes an airfoil body having a leading edge and a trailing edge joined by a pressure side and a suction side that is spaced from the pressure side to provide an external airfoil surface extending in a radial direction from at least one platform. The external airfoil surface is formed in substantial conformance with multiple cross-sectional profiles of the at least one airfoil described by a set of Cartesian coordinates set forth in Table 1. The Cartesian coordinates are provided by an axial coordinate scaled by a local axial chord, a circumferential coordinate scaled by a local axial chord, and a span location. The local axial chord corresponds to a width of the airfoil between the leading edge and the trailing edge at the span location, and the Cartesian coordinates in Table 1 have a tolerance relative to the specified coordinates of up to ±0.050 inches (±1.27 mm).

In a further non-limiting embodiment of the foregoing gas turbine engine, the at least one airfoil includes thirty-two airfoils providing a first stage of stator vanes in a high pressure section of said turbine section.

In a further non-limiting embodiment of either of the foregoing gas turbine engines, the span location corresponds to a distance from an engine central longitudinal axis.

In a further non-limiting embodiment of any of the foregoing gas turbine engines, the distance is measured with respect to the reference radius.

In a further non-limiting embodiment of any of the foregoing gas turbine engines, the airfoil body includes a root portion, a mid-span portion and a tip portion.

In a further non-limiting embodiment of any of the foregoing gas turbine engines, the airfoil body extends in the radial direction between an inner platform and an outer platform.

In a further non-limiting embodiment of any of the foregoing gas turbine engines, the tolerance is a manufacturing tolerance of ±0.050 inches (±1.27 mm).

In a further non-limiting embodiment of any of the foregoing gas turbine engines, the tolerance is a measurement tolerance of ±0.025 inches (±0.635 mm).

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
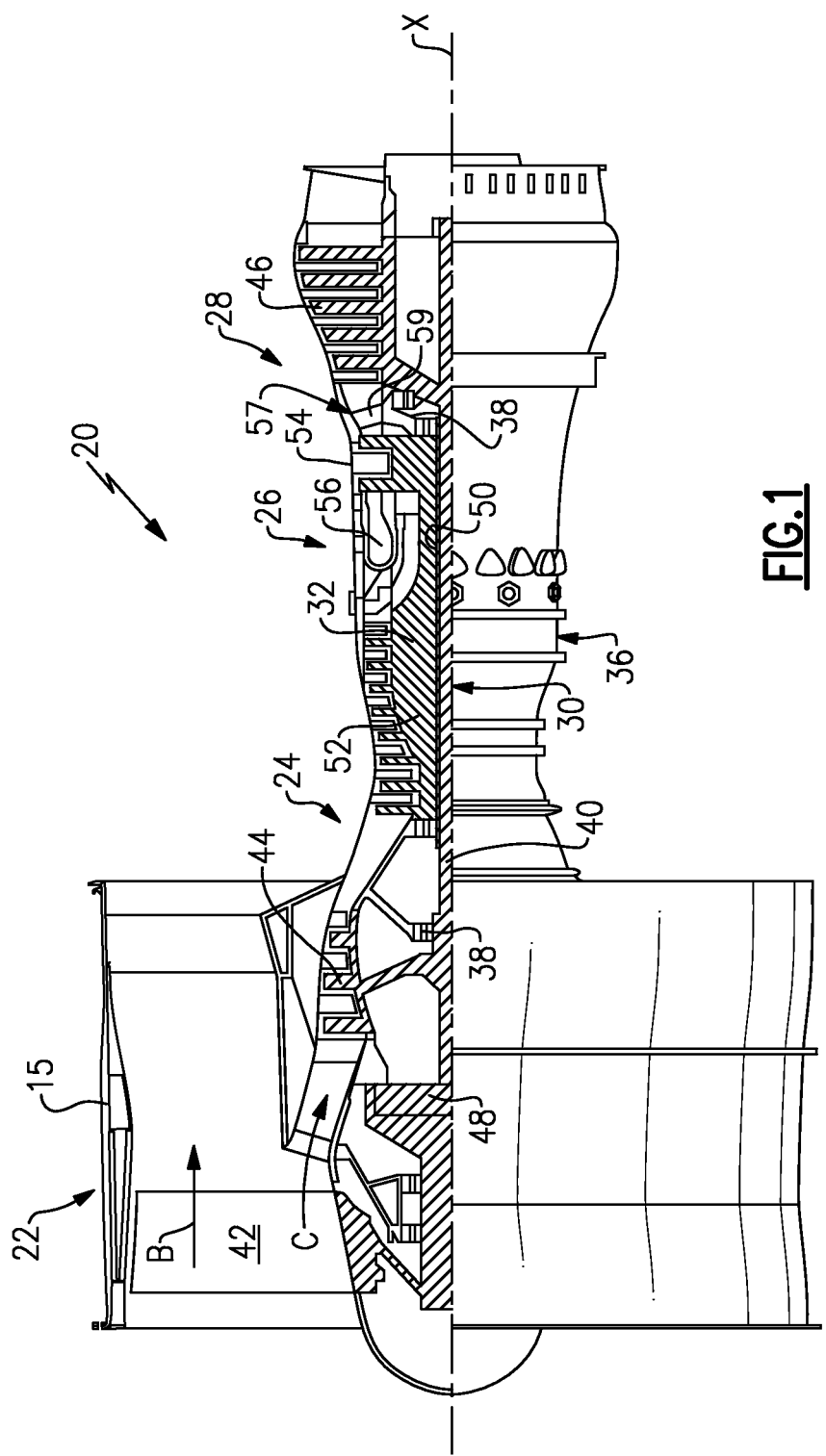
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28 and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
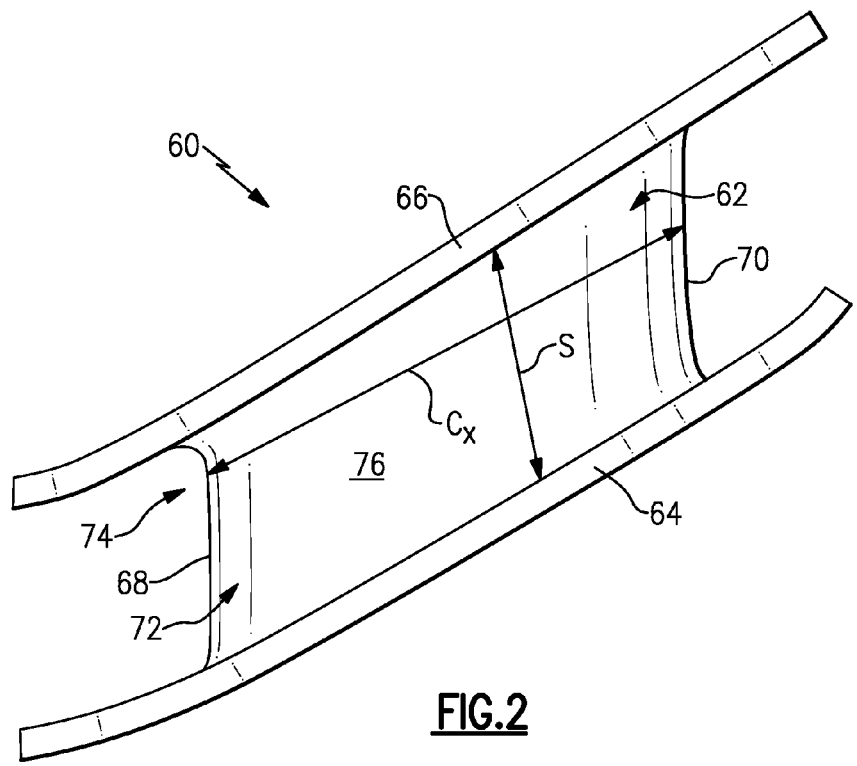
FIG. 2 illustrates an airfoil that may be incorporated into a gas turbine engine.
Figure 3:
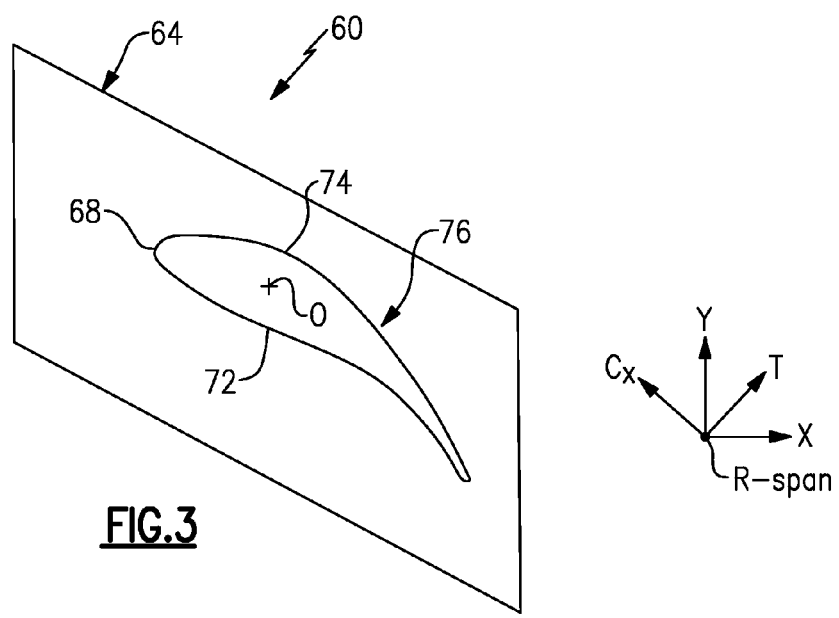
FIG. 3 illustrates a plan view of an airfoil illustrating directional references.

FIGS. 2 and 3 illustrate an airfoil 60 that may be incorporated into a gas turbine engine, such as the gas turbine engine 20. In this disclosure, the term "airfoil" is defined to encompass both blades and vanes. The airfoil 60 of this particular embodiment is a stator vane of the high pressure turbine 54. In one embodiment, the high pressure turbine 54 includes an array of thirty-two such airfoils 60, and the array provides a first stage of vanes in the high pressure turbine 54. However, this disclosure is not limited to this particular airfoil arrangement, and it should be understood that this disclosure could extend to any airfoil that is disposed within the core flow path C of the gas turbine engine 20.

The airfoil 60 includes an airfoil body 62 that extends between an inner platform 64 (on an inner diameter side) and an outer platform 66 (on an outer diameter side). The airfoil 60 also includes a leading edge 68, a trailing edge 70, a pressure side 72 (a concave side) and a suction side 74 (a convex side). The airfoil body 62 extends in a chord wise direction $C_x$ between the leading edge 68 and the trailing edge 70 and extends in span S, or in the radial direction, between the inner platform 64 and the outer platform 66. As shown best in FIG. 3, the airfoil 60 extends between the pressure side 72 and the suction side 74 in an airfoil thickness direction T, which is generally perpendicular to the cord wise direction $C_x$. The airfoil 60 can also extend circumferentially in a circumferential direction Y. As used herein, the circumferential direction Y should be interpreted as being tangent to a true "circumferential" direction, which would extend about an axis. The leading edge 68, trailing edge 70, pressure side 72 and suction side 74 of the airfoil body 62 establish an external airfoil surface 76 of the airfoil 60.

Figure 4A:
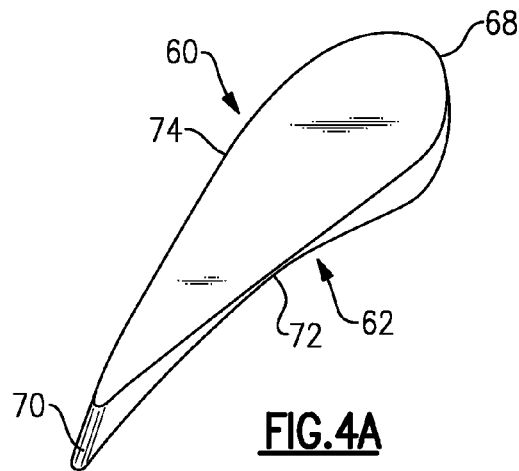
FIGS. 4A, 4B and 4C illustrate multiple views of an airfoil.
Figure 4B:
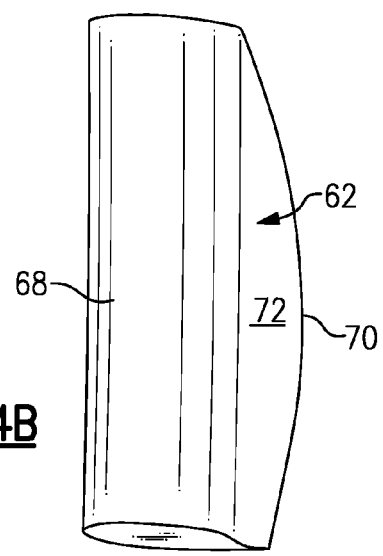
Figure 4C:
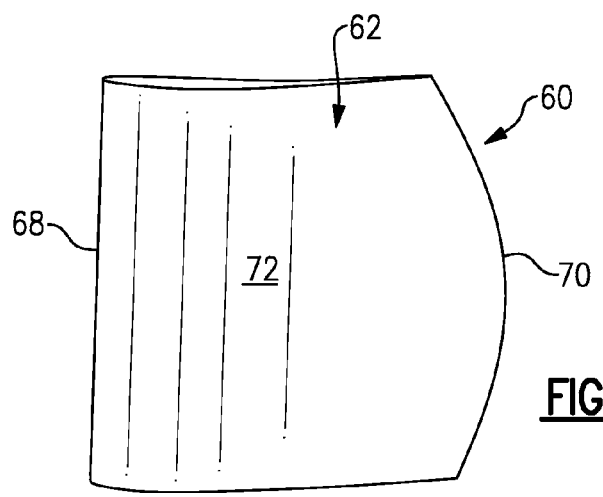

FIGS. 4A, 4B and 4C illustrate various views of the airfoil 60. The airfoil 60 may be constructed from a high strength, heat resistant material, such as a nickel based or cobalt based super alloy, or of a high temperature, stress resistant ceramic or composite material. In cooled configurations, internal fluid passages and external cooling apertures provide for a combination of impingent and film cooling. In addition, one or more thermal barrier coatings, abrasion resistance coatings or other protective coatings may be applied to the airfoil 60.

Figure 5:
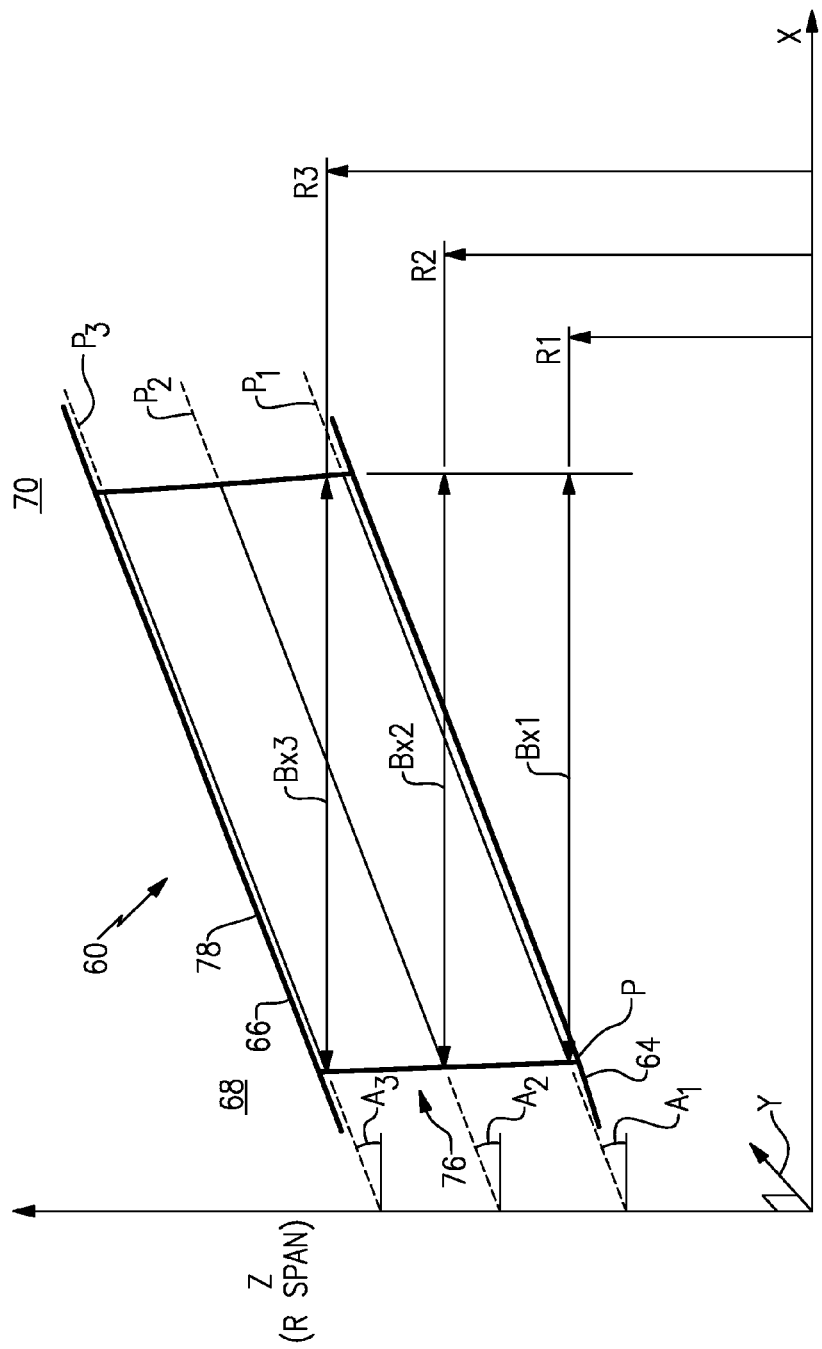
FIG. 5 illustrates multiple span positions and local axial chords of the airfoil that is referenced in Table 1.

Referring to FIG. 5 (and with continued reference to FIGS. 1-4), the geometry of the external airfoil surface 76 of the airfoil 60 may be described in terms of Cartesian coordinates defined along x, y and z axes, which respectively correspond to the axial (x), circumferential (y) and radial (z) directions. The radial coordinates are referenced from reference radii R1, R2 and R3, as shown in FIG. 5, from the engine central longitudinal axis X. In this embodiment, the "0" span is taken at a point P where the airfoil meets the inner platform 64 at the leading edge 68 (i.e., a root portion). The overall radial span is the distance from point P to a tip 78 in the radial direction (z), which corresponds to reference radius R3, or the point where the airfoil body 62 connects to the outer platform 66 at the leading edge 68 (i.e., a tip portion). The reference radius R2 represents a mid-span portion of the airfoil 60 that is between reference radii R1 and R3. In one embodiment, the reference radius R1 is 8.45 inches (about 214.63 mm), the reference radius R2 is 8.86 inches (about 225.14 mm), and the reference radius R3 is 9.35 inches (about 237.49 mm).

The axial (x) and circumferential (y) coordinates are normalized relative to a local axial chord ($B_x$) for a given reference radius R1, R2 and R3. By way of example, the local axial chord $B_{x1}$ for the axial (x) and circumferential (y) coordinates associated with the reference radius R1 corresponds to the width of the airfoil body 62 between the leading edge 68 and the trailing edge 70 along the plane $P_1$.

The geometry of the external airfoil surface 76 of the airfoil 60 is set forth in Table 1, which provides the axial (x) and circumferential (y) coordinates of the external airfoil surface 76. Table 1 includes only axial (x) and circumferential (y) coordinates, although the contour of the airfoil may vary in the radial (z). For purposes of explanation, however, Table 1 lays out three sets of coordinates with the radial (z) coordinates held constant. That is, each of the three sets of coordinates in Table 1 are taken along three planes $P_1$, $P_2$ and $P_3$, each of which are inclined relative to the engine central longitudinal axis X at respective angles $A_1$, $A_2$ and $A_3$. In the illustrated example, the inner platform is inclined at angle $A_1$, and the outer platform is inclined at angle $A_3$. In one example the angles $A_1$-$A_3$ are substantially the same. In another example, the angles $A_1$ and $A_3$ are different, and may be provided such that the inner and outer platforms 64, 66 converge toward one another (moving left to right relative to FIG. 5). The coordinates in Table 1 are reported relative to the axial (x) and circumferential (y) directions, with the planes $P_1$, $P_2$, and $P_3$ rotated thru the respective angles $A_1$-$A_3$ (clockwise relative to FIG. 5) to be in the x-y plane. In one example, the coordinates and Table 1 are made with reference to an origin 0 (FIG. 3) within the interior profile of the airfoil 6, although it should be understood that the coordinates in Table 1 could be transposed and defined relative to another origin.

The coordinates in Table 1 are provided in inches (in), but can be converted to metric (mm) by multiplying by 25.4. The external airfoil surface 76 is formed in substantial conformance with multiple cross-sectional profiles of the airfoil 60 that are described by the set of Cartesian coordinates set forth in Table 1. In one embodiment, three dimensional airfoil surfaces are formed by joining adjacent points in Table 1 in a smooth manner and adjoining adjacent sections of the multiple cross-sectional profiles of the airfoil 60 along its radial span. The manufacturing tolerance relative to the specified coordinate is ±0.050 inches (±1.27 mm). The coordinates define points on a cold, uncoated, stationary airfoil surface, in a plane at multiple span positions. Additional elements such as cooling holes, protective coatings, fillets and seal structures may also be formed onto the specified airfoil surface, or onto an adjacent platform surface, but these elements are not necessarily described by the normalized coordinates of Table 1.

TABLE 1

Reference Radius R1
Section Coordinates (X/BX1, Y/BX1)

| X/BX1 | Y/BX1 |
|---|---|
| −0.4853 | −0.3310 |
| −0.4853 | −0.3289 |
| −0.4853 | −0.3270 |
| −0.4852 | −0.3233 |
| −0.4851 | −0.3202 |
| −0.4848 | −0.3147 |
| −0.4842 | −0.3074 |

TABLE 1-continued

| | |
|---|---|
| −0.4832 | −0.2983 |
| −0.4814 | −0.2859 |
| −0.4781 | −0.2699 |
| −0.4729 | −0.2508 |
| −0.4648 | −0.2285 |
| −0.4532 | −0.2042 |
| −0.4372 | −0.1782 |
| −0.4160 | −0.1515 |
| −0.3888 | −0.1257 |
| −0.3580 | −0.0978 |
| −0.3251 | −0.0668 |
| −0.2921 | −0.0333 |
| −0.2578 | 0.0038 |
| −0.2231 | 0.0432 |
| −0.1893 | 0.0832 |
| −0.1552 | 0.1251 |
| −0.1216 | 0.1677 |
| −0.0886 | 0.2108 |
| −0.0562 | 0.2543 |
| −0.0241 | 0.2985 |
| 0.0071 | 0.3426 |
| 0.0382 | 0.3877 |
| 0.0687 | 0.4331 |
| 0.0986 | 0.4786 |
| 0.1283 | 0.5249 |
| 0.1574 | 0.5714 |
| 0.1860 | 0.6183 |
| 0.2141 | 0.6655 |
| 0.2419 | 0.7134 |
| 0.2683 | 0.7602 |
| 0.2941 | 0.8073 |
| 0.3186 | 0.8531 |
| 0.3408 | 0.8961 |
| 0.3616 | 0.9376 |
| 0.3804 | 0.9762 |
| 0.3971 | 1.0116 |
| 0.4120 | 1.0442 |
| 0.4249 | 1.0733 |
| 0.4361 | 1.0995 |
| 0.4455 | 1.1222 |
| 0.4532 | 1.1415 |
| 0.4594 | 1.1574 |
| 0.4651 | 1.1694 |
| 0.4714 | 1.1758 |
| 0.4777 | 1.1793 |
| 0.4833 | 1.1808 |
| 0.4870 | 1.1811 |
| 0.4906 | 1.1809 |
| 0.4924 | 1.1807 |
| 0.4942 | 1.1803 |
| 0.4965 | 1.1796 |
| 0.4987 | 1.1787 |
| 0.5029 | 1.1763 |
| 0.5069 | 1.1730 |
| 0.5111 | 1.1674 |
| 0.5147 | 1.1578 |
| 0.5145 | 1.1450 |
| 0.5124 | 1.1275 |
| 0.5095 | 1.1049 |
| 0.5054 | 1.0772 |
| 0.5000 | 1.0449 |
| 0.4929 | 1.0079 |
| 0.4844 | 0.9658 |
| 0.4748 | 0.9193 |
| 0.4638 | 0.8680 |
| 0.4514 | 0.8118 |
| 0.4378 | 0.7511 |
| 0.4235 | 0.6885 |
| 0.4077 | 0.6212 |
| 0.3910 | 0.5516 |
| 0.3742 | 0.4827 |
| 0.3570 | 0.4115 |
| 0.3398 | 0.3408 |
| 0.3228 | 0.2704 |
| 0.3063 | 0.1998 |
| 0.2904 | 0.1295 |
| 0.2737 | 0.0594 |
| 0.2548 | −0.0103 |
| 0.2333 | −0.0793 |
| 0.2090 | −0.1474 |

TABLE 1-continued

| | |
|---|---|
| 0.1813 | −0.2142 |
| 0.1495 | −0.2790 |
| 0.1138 | −0.3420 |
| 0.0732 | −0.4029 |
| 0.0276 | −0.4600 |
| −0.0218 | −0.5109 |
| −0.0776 | −0.5560 |
| −0.1397 | −0.5915 |
| −0.2039 | −0.6120 |
| −0.2703 | −0.6152 |
| −0.3301 | −0.5998 |
| −0.3774 | −0.5713 |
| −0.4127 | −0.5374 |
| −0.4376 | −0.5019 |
| −0.4543 | −0.4682 |
| −0.4657 | −0.4382 |
| −0.4736 | −0.4124 |
| −0.4787 | −0.3910 |
| −0.4819 | −0.3746 |
| −0.4835 | −0.3627 |
| −0.4844 | −0.3528 |
| −0.4849 | −0.3457 |
| −0.4851 | −0.3407 |
| −0.4853 | −0.3356 |
| −0.4853 | −0.3338 |

Reference Radius R2
Section Coordinates (X/BX2, Y/BX2)

| X/BX2 | Y/BX2 |
|---|---|
| −0.4803 | −0.3315 |
| −0.4803 | −0.3292 |
| −0.4803 | −0.3274 |
| −0.4802 | −0.3234 |
| −0.4800 | −0.3203 |
| −0.4797 | −0.3145 |
| −0.4791 | −0.3070 |
| −0.4779 | −0.2976 |
| −0.4758 | −0.2847 |
| −0.4720 | −0.2680 |
| −0.4659 | −0.2482 |
| −0.4566 | −0.2256 |
| −0.4432 | −0.2007 |
| −0.4248 | −0.1746 |
| −0.4004 | −0.1485 |
| −0.3695 | −0.1239 |
| −0.3366 | −0.0959 |
| −0.3036 | −0.0623 |
| −0.2711 | −0.0256 |
| −0.2375 | 0.0150 |
| −0.2038 | 0.0580 |
| −0.1710 | 0.1017 |
| −0.1378 | 0.1475 |
| −0.1053 | 0.1938 |
| −0.0733 | 0.2405 |
| −0.0419 | 0.2875 |
| −0.0110 | 0.3349 |
| 0.0192 | 0.3822 |
| 0.0495 | 0.4306 |
| 0.0791 | 0.4789 |
| 0.1081 | 0.5271 |
| 0.1371 | 0.5761 |
| 0.1655 | 0.6251 |
| 0.1935 | 0.6743 |
| 0.2210 | 0.7236 |
| 0.2484 | 0.7736 |
| 0.2743 | 0.8219 |
| 0.2997 | 0.8705 |
| 0.3239 | 0.9175 |
| 0.3459 | 0.9614 |
| 0.3666 | 1.0038 |
| 0.3853 | 1.0430 |
| 0.4019 | 1.0788 |
| 0.4169 | 1.1118 |
| 0.4296 | 1.1408 |
| 0.4408 | 1.1672 |
| 0.4502 | 1.1899 |
| 0.4579 | 1.2092 |
| 0.4640 | 1.2250 |
| 0.4694 | 1.2374 |
| 0.4758 | 1.2441 |
| 0.4819 | 1.2476 |
| 0.4876 | 1.2493 |
| 0.4913 | 1.2497 |
| 0.4951 | 1.2496 |
| 0.4970 | 1.2493 |
| 0.4989 | 1.2490 |
| 0.5012 | 1.2483 |
| 0.5034 | 1.2474 |
| 0.5078 | 1.2451 |
| 0.5119 | 1.2418 |
| 0.5161 | 1.2364 |
| 0.5197 | 1.2268 |
| 0.5194 | 1.2143 |
| 0.5174 | 1.1970 |
| 0.5146 | 1.1748 |
| 0.5106 | 1.1474 |
| 0.5054 | 1.1156 |
| 0.4984 | 1.0791 |
| 0.4899 | 1.0372 |
| 0.4805 | 0.9911 |
| 0.4697 | 0.9398 |
| 0.4574 | 0.8837 |
| 0.4440 | 0.8229 |
| 0.4299 | 0.7600 |
| 0.4141 | 0.6919 |
| 0.3976 | 0.6218 |
| 0.3811 | 0.5518 |
| 0.3642 | 0.4794 |
| 0.3475 | 0.4072 |
| 0.3310 | 0.3351 |
| 0.3151 | 0.2626 |
| 0.2997 | 0.1904 |
| 0.2836 | 0.1181 |
| 0.2656 | 0.0464 |
| 0.2449 | −0.0250 |
| 0.2218 | −0.0956 |
| 0.1955 | −0.1653 |
| 0.1658 | −0.2334 |
| 0.1327 | −0.3000 |
| 0.0950 | −0.3654 |
| 0.0523 | −0.4278 |
| 0.0055 | −0.4843 |
| −0.0484 | −0.5355 |
| −0.1103 | −0.5770 |
| −0.1756 | −0.6022 |
| −0.2440 | −0.6091 |
| −0.3068 | −0.5973 |
| −0.3583 | −0.5723 |
| −0.3978 | −0.5400 |
| −0.4260 | −0.5050 |
| −0.4450 | −0.4711 |
| −0.4581 | −0.4409 |
| −0.4670 | −0.4147 |
| −0.4728 | −0.3930 |
| −0.4764 | −0.3760 |
| −0.4783 | −0.3640 |
| −0.4794 | −0.3538 |
| −0.4799 | −0.3466 |
| −0.4801 | −0.3415 |
| −0.4803 | −0.3360 |
| −0.4803 | −0.3344 |

Reference Radius R3
Section Coordinates (X/BX3, Y/BX3)

| X/BX3 | Y/BX3 |
|---|---|
| −0.4821 | −0.3320 |
| −0.4821 | −0.3302 |
| −0.4821 | −0.3280 |
| −0.4820 | −0.3241 |
| −0.4818 | −0.3210 |
| −0.4815 | −0.3151 |
| −0.4809 | −0.3080 |
| −0.4799 | −0.2984 |
| −0.4779 | −0.2858 |
| −0.4742 | −0.2690 |
| −0.4684 | −0.2494 |

TABLE 1-continued

| | |
|---|---|
| −0.4596 | −0.2269 |
| −0.4468 | −0.2020 |
| −0.4292 | −0.1756 |
| −0.4058 | −0.1490 |
| −0.3768 | −0.1227 |
| −0.3463 | −0.0927 |
| −0.3155 | −0.0576 |
| −0.2848 | −0.0198 |
| −0.2528 | 0.0216 |
| −0.2204 | 0.0651 |
| −0.1886 | 0.1090 |
| −0.1563 | 0.1549 |
| −0.1244 | 0.2010 |
| −0.0931 | 0.2474 |
| −0.0620 | 0.2939 |
| −0.0314 | 0.3405 |
| −0.0012 | 0.3872 |
| 0.0289 | 0.4343 |
| 0.0585 | 0.4812 |
| 0.0879 | 0.5282 |
| 0.1172 | 0.5757 |
| 0.1463 | 0.6232 |
| 0.1748 | 0.6704 |
| 0.2031 | 0.7177 |
| 0.2313 | 0.7652 |
| 0.2581 | 0.8110 |
| 0.2847 | 0.8569 |
| 0.3100 | 0.9011 |
| 0.3332 | 0.9422 |
| 0.3554 | 0.9821 |
| 0.3755 | 1.0185 |
| 0.3935 | 1.0518 |
| 0.4096 | 1.0822 |
| 0.4237 | 1.1091 |
| 0.4360 | 1.1332 |
| 0.4464 | 1.1539 |
| 0.4550 | 1.1714 |
| 0.4621 | 1.1863 |
| 0.4680 | 1.1973 |
| 0.4746 | 1.2034 |
| 0.4808 | 1.2064 |
| 0.4864 | 1.2078 |
| 0.4898 | 1.2080 |
| 0.4937 | 1.2078 |
| 0.4955 | 1.2075 |
| 0.4973 | 1.2072 |
| 0.4997 | 1.2065 |
| 0.5018 | 1.2056 |
| 0.5061 | 1.2033 |
| 0.5102 | 1.2001 |
| 0.5143 | 1.1950 |
| 0.5179 | 1.1859 |
| 0.5179 | 1.1743 |
| 0.5164 | 1.1573 |
| 0.5144 | 1.1364 |
| 0.5116 | 1.1100 |
| 0.5078 | 1.0796 |
| 0.5027 | 1.0444 |
| 0.4960 | 1.0042 |
| 0.4875 | 0.9597 |
| 0.4768 | 0.9100 |
| 0.4639 | 0.8558 |
| 0.4497 | 0.7972 |
| 0.4351 | 0.7360 |
| 0.4191 | 0.6698 |
| 0.4025 | 0.6015 |
| 0.3860 | 0.5329 |
| 0.3692 | 0.4616 |
| 0.3526 | 0.3907 |
| 0.3362 | 0.3196 |
| 0.3202 | 0.2479 |
| 0.3046 | 0.1764 |
| 0.2881 | 0.1045 |
| 0.2694 | 0.0334 |
| 0.2476 | −0.0374 |
| 0.2232 | −0.1075 |
| 0.1959 | −0.1764 |
| 0.1651 | −0.2442 |
| 0.1314 | −0.3103 |
| 0.0929 | −0.3753 |
| 0.0492 | −0.4369 |
| 0.0011 | −0.4925 |
| −0.0544 | −0.5425 |
| −0.1168 | −0.5821 |
| −0.1825 | −0.6061 |
| −0.2508 | −0.6124 |
| −0.3137 | −0.6006 |
| −0.3652 | −0.5752 |
| −0.4039 | −0.5418 |
| −0.4307 | −0.5059 |
| −0.4486 | −0.4716 |
| −0.4609 | −0.4412 |
| −0.4693 | −0.4151 |
| −0.4749 | −0.3934 |
| −0.4783 | −0.3764 |
| −0.4801 | −0.3645 |
| −0.4812 | −0.3542 |
| −0.4817 | −0.3471 |
| −0.4819 | −0.3420 |
| −0.4821 | −0.3368 |
| −0.4821 | −0.3348 |

In general, the airfoil 60, as described herein, has a combination of axial sweep and tangential lean. Depending on the configuration, the lean and sweep angles sometimes vary by up to ±10° or more. In addition, the airfoil 60 can be rotated with respect to a radial axis or normal to the platform or shroud surface, for example by up to ±10° or more.

Novel aspects of the airfoil 60 and the external airfoil surface 76 are achieved by substantial conformance to specified geometries. Substantial conformance generally includes or may include a manufacturing tolerance of about ±0.050 inches (±1.27 mm), in order to account for variations in molding, cutting, shaping, surface finishing and other manufacturing processes, and to accommodate variability in coating thicknesses. Substantial conformance may also include a measurement tolerance of about ±0.025 inches (±0.635 mm). These tolerances are generally constant or not scalable, and apply to each of the specified blade surfaces, regardless of size. In one example, Table 1 represents the contour of the airfoil 60 as used in a gas turbine engine 20 (e.g., following all forming and post-processing steps).

Substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

Although the different non-limiting embodiments are illustrative as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. An airfoil for a gas turbine engine, comprising:
   an airfoil body including a leading edge and a trailing edge joined by a pressure side and a suction side spaced apart from said pressure side to provide an external airfoil surface extending in a radial direction from at least one platform; and
   wherein said external airfoil surface is formed in conformance with multiple cross-sectional profiles of the airfoil described by a set of Cartesian coordinates set forth in Table 1, said Cartesian coordinates provided by an axial coordinate scaled by a local axial chord, a circumferential coordinate scaled by a local axial chord, and a span location, wherein said local axial chord corresponds to a width of the airfoil between said leading edge and said trailing edge at said span location and said Cartesian coordinates in Table 1 have a tolerance relative to the specified coordinates of up to ±0.050 inches (±1.27 mm).

2. The airfoil as recited in claim 1, wherein the airfoil is a stator vane in a high pressure section of said turbine section.

3. The airfoil as recited in claim 1, wherein the span location corresponds to a distance from an engine central longitudinal axis.

4. The airfoil as recited in claim 3, wherein said distance is measured with respect to a reference radius.

5. The airfoil as recited in claim 1, wherein said airfoil body extends in said radial direction between an inner platform and an outer platform.

6. The airfoil as recited in claim 1, wherein said tolerance is a manufacturing tolerance of ±0.050 inches (±1.27 mm).

7. The airfoil as recited in claim 1, wherein said tolerance is a measurement tolerance of ±0.025 inches (±0.635 mm).

8. A gas turbine engine comprising:
   a compressor section;
   a combustor section fluidly connected to said compressor section;
   a turbine section fluidly connected to said combustor section;
   wherein said turbine section includes at least one airfoil, wherein said at least one airfoil includes an airfoil body having a leading edge and a trailing edge joined by a pressure side and a suction side that is spaced from said pressure side to provide an external airfoil surface extending in a radial direction from at least one platform; and
   wherein said external airfoil surface is formed in conformance with multiple cross-sectional profiles of said at least one airfoil described by a set of Cartesian coordinates set forth in Table 1, said Cartesian coordinates provided by an axial coordinate scaled by a local axial chord, a circumferential coordinate scaled by a local axial chord, and a span location, wherein said local axial chord corresponds to a width of the airfoil between said leading edge and said trailing edge at said span location and said Cartesian coordinates in Table 1 have a tolerance relative to the specified coordinates of up to ±0.050 inches (±1.27 mm).

9. The gas turbine engine as recited in claim 8, wherein said at least one airfoil includes thirty-two airfoils providing a first stage of stator vanes in a high pressure section of said turbine section.

10. The gas turbine engine as recited in claim 8, wherein said span location corresponds to a distance from an engine central longitudinal axis.

11. The gas turbine engine as recited in claim 10, wherein said distance is measured with respect to said reference radius.

12. The gas turbine engine as recited in claim 8, wherein said airfoil body includes a root portion, a mid-span portion and a tip portion.

13. The gas turbine engine as recited in claim 8, wherein said airfoil body extends in said radial direction between an inner platform and an outer platform.

14. The gas turbine engine as recited in claim 8, wherein said tolerance is a manufacturing tolerance of ±0.050 inches (±1.27 mm).

15. The gas turbine engine as recited in claim 8, wherein said tolerance is a measurement tolerance of ±0.025 inches (±0.635 mm).

* * * * *